Jan. 1, 1952     W. C. SLOTTERBACK     2,581,306
STATIONARY SPOOL REEL
Filed June 16, 1948
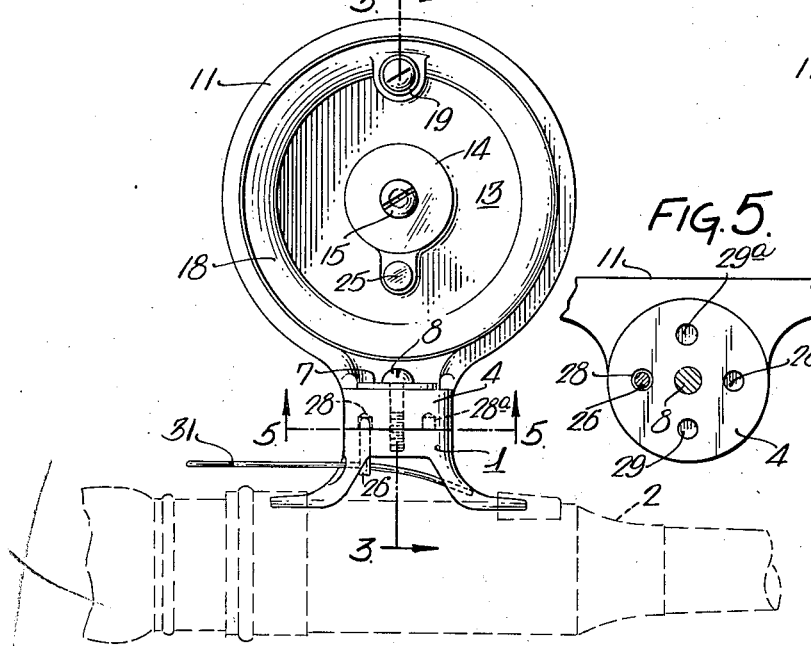
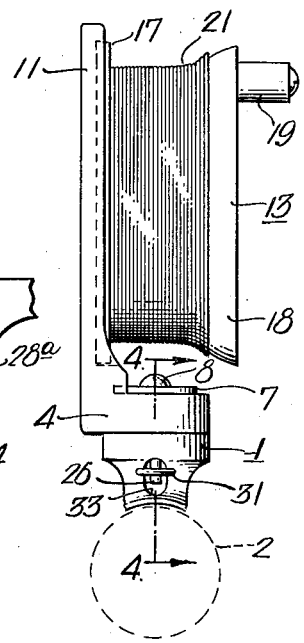
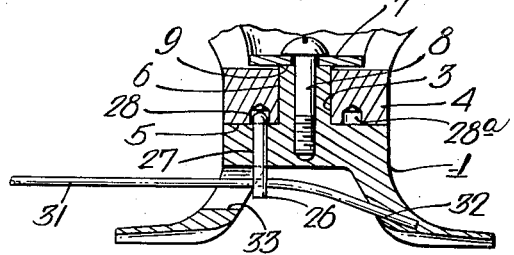
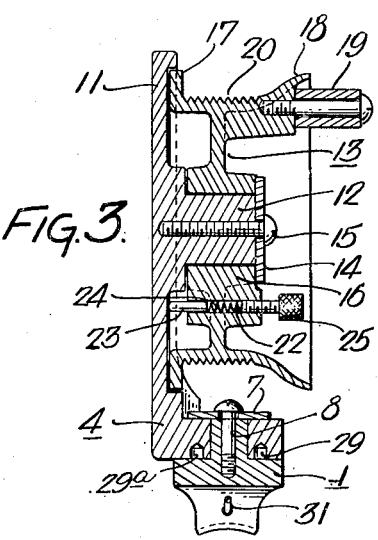
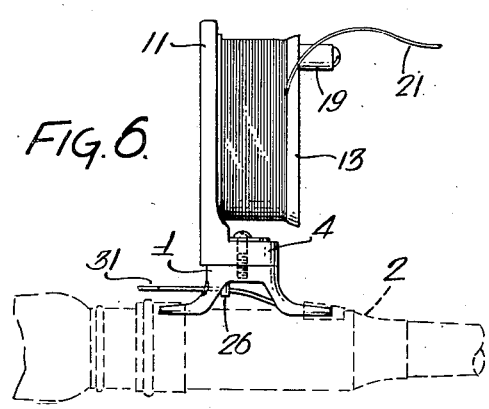
Inventor:
William C. Slotterback
by his Attorneys
Howson & Howson Patented Jan. 1, 1952

2,581,306

UNITED STATES PATENT OFFICE 2,581,306

STATIONARY SPOOL REEL

William C. Slotterback, Langhorne, Pa.

Application June 16, 1948, Serial No. 33,291

1 Claim. (Cl. 242—84.5)

This invention relates to fishing reels and more particularly to reels of the "stationary spool" type wherein provision is made for permitting the fishing line to be unwound from one end of the reel while the reel itself remains stationary. In reels of this type it is customary to provide for adjustment of the reel between alternative positions in one of which the axis of the reel parallels the rod to which the reel is attached and in the other of which the reel occupies the more conventional position wherein its axis extends transversely to the rod.

A principal object of the invention is to provide a generally improved reel of this type and one which may be produced at relatively low cost.

In the attached drawings:

Fig. 1 is an end elevational view of the reel with the spool in the normal position with respect to the associated rod;

Fig. 2 is a side view of the reel also with the spool in the said normal position;

Fig. 3 is a sectional view on the line 3—3 Fig. 1;

Fig. 4 is a sectional view on the line 4—4 Fig. 2;

Fig. 5 is a sectional view on the line 5—5 Fig. 1; and

Fig. 6 is a side elevational view of the reel adjusted so that the axis of the spool lies parallel to the associated rod and wherein a free end of the spool is presented toward the tip end of the rod for free passage of the line from the spool while the latter remains stationary.

With reference to the drawings, the reel comprises the usual base 1 having conventional means for attachment of the reel to the rod, the rod being indicated in broken lines and designated by the reference numeral 2. As shown in Fig. 4 the base member 1 has an upstanding cylindrical projection 3 which acts as a pintle for the spool bracket 4, said bracket seating upon the shoulder 5 of the base member 1 and having a cylindrical aperture 6 which neatly receives the cylindrical projection 3. The projection 3 is of slightly greater height above the shoulder 5 than the axial dimension of the aperture 6, and a washer 7 secured at the upper end of the projection 3 by means of a screw 8 and of somewhat greater diameter than the projection engages a shoulder 9 on the bracket 4 and thereby holds the bracket to the base 1 in a manner permitting adjustment of the bracket on the shoulder 5 and around the projection 3 as a pivot.

The bracket 4 has an upstanding circular flange 11 from the center of which projects a cylindrical portion 12 upon which is rotatably mounted a spool 13. The spool is held on the cylindrical portion or journal 12 by means of a washer 14 which is secured to the outer end of the portion 12 by means of a screw 15. The effective lengths of the cylindrical bearing portion 12 and of the hub portion 16 of the spool are such that the washer exerts no clamping effect on the spool which is thereby permitted to rotate freely on the journal.

The spool 13 has at the end thereof which adjoins the flange 11 of the bracket an outwardly projecting flange 17; and at the opposite end, that is the end remote from the said flange 11, the spool is flared outwardly to provide an inclined terminal flange 18. At this end also the spool is provided with a handle element 19 by means of which it may be rotated manually in the usual manner for reeling in the line, said line being indicated in the drawings by the reference numeral 21. Preferably the cylindrical portion of the spool is provided with circumferential serrations 20 (see Fig. 3) for the purpose of facilitating more uniform distribution of the line on the spool. Departing further from the conventional, the spool 13 is provided with a tapped bore 22 the inner end of which, i. e., that end which confronts the flange 11 of the bracket 4, receives a pin 23 which is projected outwardly and into frictional engagement with the confronting face of the flange 11 by means of a spring 24, also occupying the bore 22 and confined under compression between the inner end of the pin 23 and an adjusting screw 25 in the outer threaded end of the bore. By adjustment of the screw 25 the pressure of the spring 24 upon the pin 23 may be regulated. This device constitutes an adjustable drag to afford a desired amount of frictional resistance to the free turning of the reel 13.

As previously set forth the bracket 4 is adjustable about the cylindrical extension 3 between alternative positions in one of which the spool 13 occupies a position with respect to the rod 2 as shown in Figs. 1 and 2, and in the other of which positions the spool occupies the relative position shown in Fig. 6. In accordance with the invention, means is provided for retaining the reel positively locked in each of these alternative positions. The locking device in the present instance consists of a locking pin 26 (see Fig. 4) which is slidably supported in an aperture 27 in the base 1. The upper end of the pin 26 projects into one or other of four recesses or sockets 28, 29, 28a and 29a in the under side of the spool bracket 4, see Fig. 5, to lock the bracket in the respective alternative positions mentioned above. Thus, as shown in Fig. 4, the pin projecting into the recess 28 locks the bracket in the position in which it is shown in Fig. 1; and the recess 29 provides the means for locking the bracket in the position of Fig. 6. If the bracket is turned through 180° from the position of Fig. 1, the recess 28a will be brought into position to receive the locking pin 26, this position being useful for left-hand operators. By means of the recess 29a, the bracket may be locked in position wherein the free end of the spool will face the handle end of the rod. It is apparent that the ability to adjust the bracket through 360° and to positively lock the bracket in the four 90° positions described above, renders the reel equally adaptable for use by both right and left-hand operators.

The pin 26 may be retracted downwardly to clear the said recesses by means of a spring arm 31 supported at one end 32 in the base 1 and connected to the pin 26. This spring lever 31 projects through an aperture 33 in the base 1 in the direction of the handle portion of the rod and in a position parallel to the latter for manipulation by the thumb or finger of the operator. By its own inherent resiliency the lever 31 normally occupies the relatively elevated position in which it is shown in the drawings, thereby supporting the pin 26 in the elevated or bracket-locking position. Pressure on the outer end of the lever will cause it to flex downwardly withdrawing the pin 26 from the locking recess as described above. When the pin is thus retracted, the bracket may be adjusted angularly about the projection 3 to the desired position, and if the lever is released the pin 26 will automatically enter the locking recess when the latter registers with the pin.

The mode of operation of the reel will be apparent from the foregoing description. In casting, the reel is adjusted to the spool position of Fig. 6 so that the line may pass from the reel over the unobstructed end of the spool which is presented toward the tip end of the rod. Subsequently, the reel will be adjusted to the position shown in Fig. 1 wherein it may be manipulated in the usual manner through the handle element 19.

I claim:

A fishing reel of the stated type comprising a base adapted for attachment in predetermined position to a rod, a bracket pivotally mounted on the base for adjustment through an angle of at least 180 degrees, a spool rotatably mounted on a cylindrical bearing projecting from one face of the bracket and having one axial end unobstructed, means for positively locking the spool selectively in at least three alternative positions of adjustment separated by angles of 90 degrees, said spool in at least one of said positions being disposed with its rotary axis parallel to said rod, an element movably mounted in a recess in the spool for frictional engagement with a confronting face of the bracket, a screw in the outer threaded end of said recess exposed at the unobstructed end of the spool, and a spring confined between the friction element and the screw and exerting resilient pressure on said element to retain it in frictional engagement with the bracket, said screw affording a means for adjusting the pressure of the spring for regulation of said friction.

WILLIAM C. SLOTTERBACK.

REFERENCES CITED

The following references are of record in the file of this patent:

UNITED STATES PATENTS

| Number | Name | Date |
| --- | --- | --- |
| 369,622 | Titus, Jr. | Sept. 6, 1887 |
| 386,705 | Graham | July 24, 1888 |
| 2,191,004 | Whitcomb | Feb. 20, 1940 |
| 2,283,773 | Teitsma | May 19, 1942 |
| 2,397,955 | Fowler | Apr. 9, 1946 |
| 2,439,298 | Horan | Apr. 6, 1948 |